United States Patent
Ruat et al.

(10) Patent No.: US 7,408,958 B2
(45) Date of Patent: Aug. 5, 2008

(54) DEVICE FOR TRANSMITTING ASYNCHRONOUS DATA HAVING CLOCK DEVIATION CONTROL

(75) Inventors: Ludovic Ruat, Saint Savourin (FR); Paul Kinowski, Aix-en-Provence (FR); Alexander Czajor, Bouc Bel Air (FR)

(73) Assignee: STMicroelectronics SA, Montrouge (FR)

( * ) Notice: Subject to any disclaimer, the term of this patent is extended or adjusted under 35 U.S.C. 154(b) by 1053 days.

(21) Appl. No.: 10/826,969

(22) Filed: Mar. 31, 2004

(65) Prior Publication Data

US 2004/0233937 A1 Nov. 25, 2004

Related U.S. Application Data

(63) Continuation of application No. PCT/FR02/03478, filed on Oct. 11, 2002.

(30) Foreign Application Priority Data

Oct. 15, 2001 (FR) .................................. 01 13269

(51) Int. Cl.
*H04J 3/06* (2006.01)

(52) U.S. Cl. ........................................ 370/503; 370/358

(58) Field of Classification Search ................. 370/324, 370/389, 391, 503, 509, 510, 511, 512, 513, 370/514, 520

See application file for complete search history.

(56) References Cited

U.S. PATENT DOCUMENTS

| | | | | |
|---|---|---|---|---|
| 3,754,102 A * | 8/1973 | Clark | .......................... | 370/510 |
| 5,131,013 A * | 7/1992 | Choi | .......................... | 375/372 |
| 5,299,237 A | 3/1994 | Head | .......................... | 375/120 |
| 5,563,891 A * | 10/1996 | Wang | .......................... | 370/505 |
| 6,359,946 B1 * | 3/2002 | Ryan | .......................... | 375/371 |

FOREIGN PATENT DOCUMENTS

| | | |
|---|---|---|
| EP | 0413073 | 2/1991 |
| EP | 1126618 | 8/2001 |

* cited by examiner

*Primary Examiner*—Brenda Pham
(74) *Attorney, Agent, or Firm*—Lisa K. Jorgenson; Allen, Dyer, Doppelt, Milbrath & Gilchrist, P.A.

(57) ABSTRACT

An asynchronous data transmission device includes a data reception terminal receiving data clocked by a sampling signal in synchronization with a local clock signal. A register is connected to the data reception terminal for receiving the data. A clock deviation measuring circuit is connected to the register for determining a number M of periods of the sampling signal appearing during K periods of a synchronization signal received on the data reception terminal, and for comparing the number M to a tolerance margin defined by a lower threshold and an upper threshold.

27 Claims, 7 Drawing Sheets

DEVICE FOR TRANSMITTING ASYNCHRONOUS DATA HAVING CLOCK DEVIATION CONTROL

RELATED APPLICATION

The present application is a continuation of International Application No. PCT/FR02/03478 filed on Oct. 11, 2002, the entire disclosure of which is incorporated herein by reference.

FIELD OF THE INVENTION

The present invention relates to asynchronous data transmissions and to asynchronous data transmission devices generally called Universal Asynchronous Receiver/Transmitters (UART).

BACKGROUND OF THE INVENTION

Asynchronous data transmissions generally include the transmission of 8-bit characters preceded by a start bit and followed by a stop bit. Conversely to synchronous data transmissions, the receiver does not receive the clock signal from the transmitter so that the respective clocks of the transmitter and of the receiver should exhibit in relation to one another a deviation not exceeding a certain value for the data to be transmitted correctly.

To increase the possibilities of asynchronous data transfer between devices exhibiting clock circuits that are not very accurate and are likely to show large deviations with time and temperature, data transmission protocols have been recently developed to enable a receiver to time its clock signal in relation to that of a transmitter by sending a synchronization character to the latter. Such protocols are consequently less demanding with regards to the deviation of the clock signal of the receiver in relation to that of the transmitter.

Figure 1:
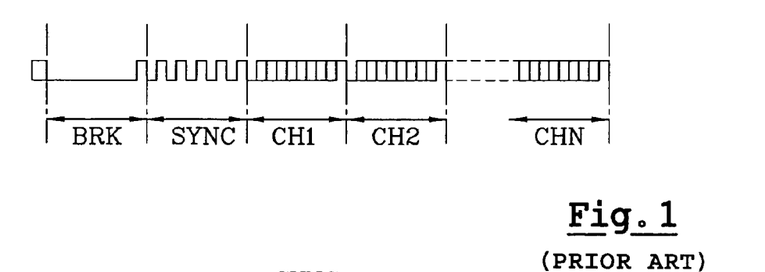
FIG. 1 illustrates schematically an asynchronous frame according to the protocol LIN in accordance with the prior art.

The phrase "local clock signal" shall designate the clock signal of the receiver, and "reference clock signal" shall designate the clock signal of the device that transmits a synchronization character. For clarification purposes, FIG. 1 represents the format of an asynchronous frame according to the protocol LIN (Local Interconnect Network) which is available on the web site www.lin-subbus.org. This frame comprises a break character BRK (stop character) comprising a set number of bits equal to 0 and a last bit equal to 1 (extra bit), a synchronization character SYNC, and data characters CH1, CH2 ... $CH_N$. The character CH1 serves as an identification field to enable multipoint links between a master device and slave devices.

Figure 2:
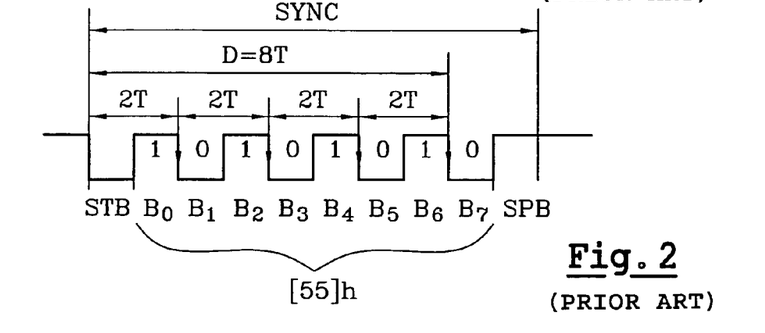
FIG. 2 illustrates a synchronization character in the protocol LIN illustrated in FIG. 1.

The character SYNC is represented in more detail in FIG. 2 and is equal to [55]h in hexadecimal notation, i.e., the character 10101010 in binary (bits B0 to B7). This synchronization character is preceded by a start bit STB equal to 0 and followed by a stop bit equal to 1. In total, 5 falling edges are available to tune a local clock signal in relation to the reference clock signal of the character SYNC. The time between the 5 falling edges is equal to 8 times the period T of the reference clock signal. Measuring this duration enables one to derive the reference period T and to tune the local clock signal to the latter.

Figure 3:
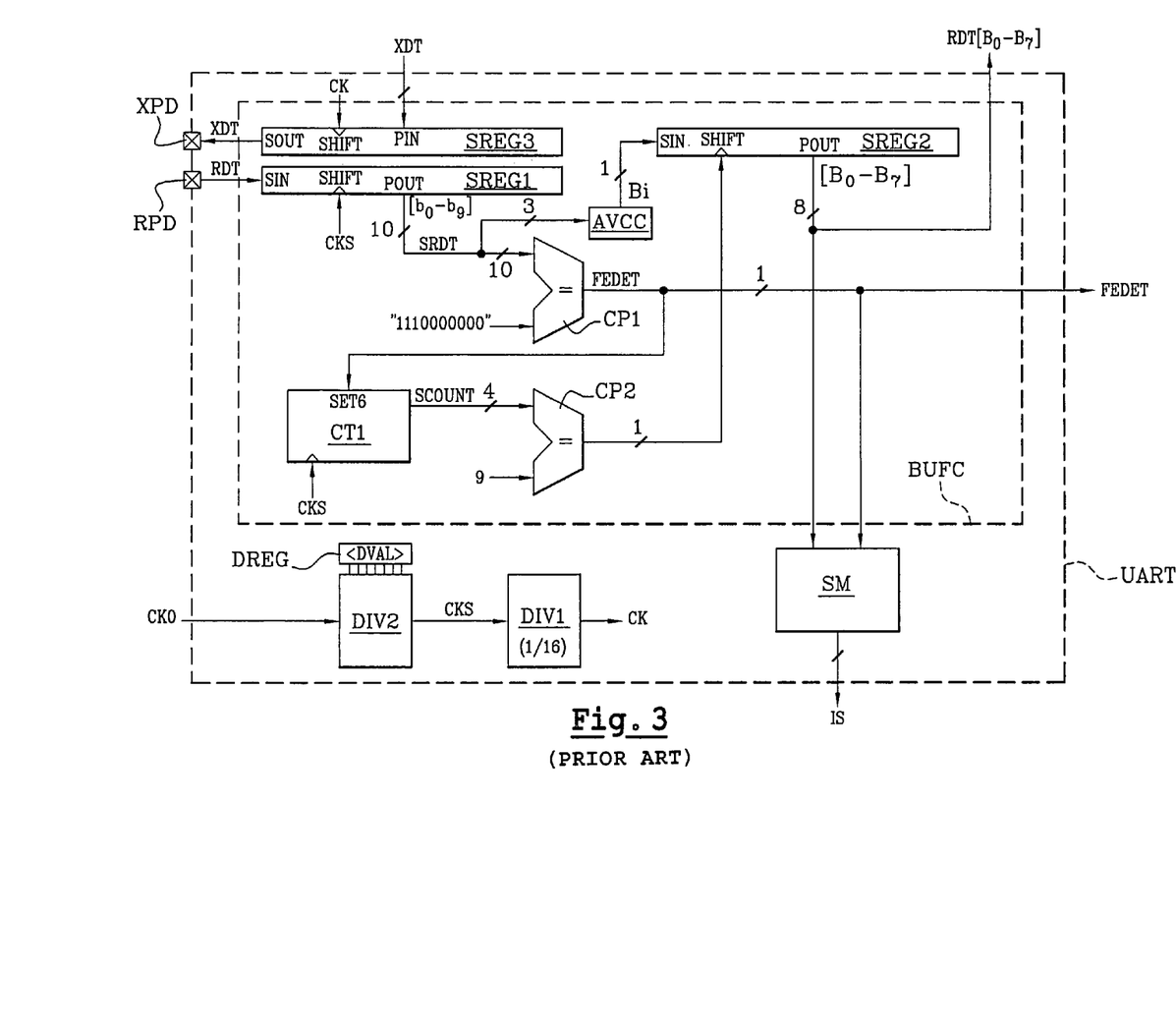
FIG. 3 is a block diagram of a conventional circuit UART in accordance with the prior art.
Figure 4A:
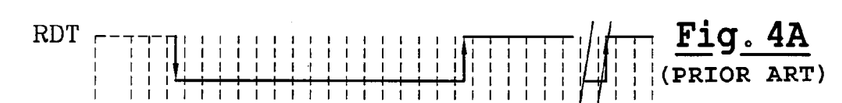
FIGS. 4A to 4E illustrate logic signals appearing in the circuit UART of FIG. 3 during the detection of a falling edge.
Figure 4B:
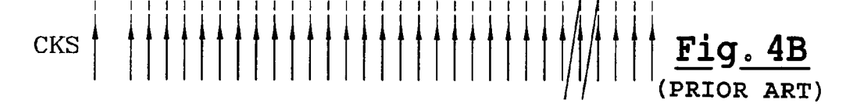
Figures 4C, 4D:
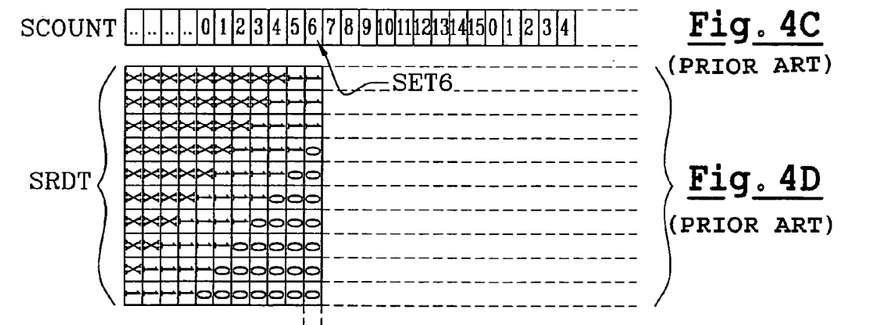
Figure 4E:
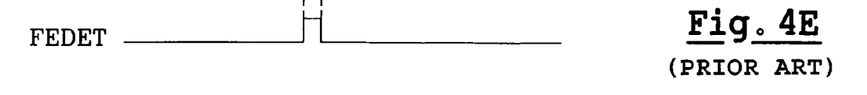

FIG. 3 represents schematically the architecture of a circuit UART enabling one to time a local clock signal CK with the clock signal of a SYNC character. The local clock signal CK is delivered by a divider DIV1, generally a divider by 16, receiving at an input a sampling signal CKS. The signal CKS is delivered by a programmable divider DIV2 receiving at an input a primary clock signal CK0. The ratio between the frequency of the signal CK0 and that of the signal CKS is determined by a value DVAL loaded in a register DREG of the programmable divider.

The circuit UART comprises a buffer circuit BUFC and a status machine SM which identifies the break and synchronization characters, and delivers information signals IS to the outside world. The outside world is, for instance, a microcontroller architecture (not represented) within which the circuit UART has been implanted. The signals IS indicate, for instance, that a character SYNC is being received, and that data received is available for writing into the circuit BUFC, etc.

The buffer circuit BUFC comprises two reception registers SREG1 and SREG2, a transmission register SREG3, a 4-bit counter CT1 (counter by 16), two logic comparators CP1 and CP2, and a circuit AVCC. The register SREG1 is a 10-bit shift register whose input SHIFT is synchronized by the signal CKS. The register SREG1 receives data RDT on a serial input SIN connected to a data reception terminal RPD, and delivers on a parallel output POUT sampled data SRDT (bits b0 to b9). The data SRDT is applied to the input of the circuit AVCC whose output delivers a bit Bi which is sent to a serial input SIN of the register SREG2. Each bit Bi delivered by the circuit AVCC is conventionally equal to the majority value of samples of ranks 7, 8 and 9 (bits b7 to b9) present in the register SREG1.

The data SRDT is also applied to an input of the comparator CP1 whose other input receives a reference number 1110000000 forming criteria for detecting a falling edge. The comparator CP1 delivers a signal FEDET which is communicated to the outside world and is also applied to a reset-to-6 input (input SET6) of the counter CT1, which is clocked by the signal CKS. The counter CT1 delivers a signal SCOUNT for counting samples which are applied to an input of the comparator CP2, whose other input receives in binary form a reference number equal to 9 in base 10. The output from the comparator CP2 drives the shift input SHIFT of the register SREG2. Finally, the register SREG3 is a shift register clocked by the local clock signal CK, which receives data XDT on a parallel input PIN and delivers serial data XDT on an output SOUT connected to a terminal XPD Detection by the UART circuit of the falling edges of a character SYNC is illustrated in FIGS. 4A to 4E, which represent respectively the data RDT, the sampling signal CKS, the signal SCOUNT, the data SRDT sampled by the register SREG1, and the signal FEDET. When the signal FEDET becomes a 1, this indicates that a falling edge is detected, and occurs when the data SRDT is equal to 1110000000. The falling edges are detected after reception of seven samples equal to 0. The counter CT1 is tuned back to the value 6 (i.e., the seventh counting cycle from 0) when the signal FEDET becomes a 1.

After reception of the character SYNC, the data present in the characters CH1, CH2 ... is received one bit at a time. A data bit Bi is delivered by the circuit AVCC (majority value of the samples b7 to b9) which is loaded in the register SREG2 every 16 cycles of the signal CKS, i.e., at each cycle of the local clock signal CK. A bit Bi is loaded at the tenth counting cycle of the counter CT1 when the output from the comparator CP2 becomes a 1. The data received RDT is stored in the register SREG2 by a group of 8 bits B0-B7 and can be read by a parallel output POUT of that register.

The character SYNC represented in FIG. 2 enables an external calculation unit, for instance the central unit of a microcontroller, to determine the value DVAL to load in the divider DIV2 to compensate for a deviation of the local clock in relation to the reference clock. This value is such that the period Ts of the sampling signal CKS must be equal to:

$$Ts=D/(8*16)$$

D is the time measurement between the five falling edges of the synchronization character, i.e., eight periods T of the reference clock. DVAL can be calculated by software, or by a specific circuit with wired logic which can be associated with the status machine SM.

In spite of the advantages of re-synchronization of the clock due to the character SYNC, there is still a large deviation of the local clock which jeopardizes good reception of asynchronous frames. This is the case when the deviation of the local clock in relation to the reference clock is greater than the set tolerance margin. This tolerance margin depends on the number of bits equal to 0 of the break character BRK preceding the character SYNC.

Within the framework of the protocol LIN, this tolerance margin is ±15% since a break character comprises 13 bits equal to 0, and it is considered that a 11-bit detection at 0 is sufficient to detect the break character. Beyond this tolerance margin, reception of the character break can be inaccurate. For instance, a receiver having a local clock exhibiting a deviation greater than ±15% may believe that it is receiving a break character, whereas the character received is another character or is formed by a sequence of other characters. In such a case, clock retiring based upon the SYNC character may prove useless since the very detection of the bits of the character SYNC is uncertain. Thus, there is a need to address this shortcoming.

SUMMARY OF THE INVENTION

In view of the foregoing background, an object of the present invention is to assess the deviation of a local clock signal. The local clock signal is assessed in relation to a synchronization character by counting the number of sampling pulses during the reception of the synchronization character, and by comparing this number with pre-set thresholds representative of a tolerance margin.

Another object of the present invention is to incorporate in a UART device a circuit with wired logic for performing a deviation measurement, and for delivering a deviation flag exhibiting a set value when the measured deviation is outside the tolerance margin.

The present invention thus provides an asynchronous data transmission device comprising a data reception register connected to a data reception terminal, and clocked by a sampling signal in synchronization with a local clock signal. The device comprises a clock deviation measuring circuit for determining a number M of periods of the sampling signal observed during K periods of a synchronization signal received on the data reception terminal, and for comparing the number M to a lower threshold M1 and to an upper threshold M2 defining a tolerance margin.

The clock deviation measuring circuit may comprise means to deliver a deviation flag having a first logic value when the number M is not between the thresholds M1 and M2, and a second logic value when the number M is between the thresholds M1 and M2.

The clock deviation measuring circuit may also comprise means to deliver a first logic signal having a determined logic value when the number of periods of the synchronization signal is equal to K, and means to deliver a second logic signal having a determined logic value when the number M of periods of the sampling signal is between the thresholds M1 and M2. The circuit also comprises means to deliver a third logic signal having a determined logic value when the first and the second logic signals exhibit respectively the determined values.

The clock deviation measuring circuit may determine a number M of the periods of the sampling signal appearing between two edges of a same type, rising or falling, of the synchronization signal. The clock deviation measuring circuit may also determine a number M of the periods of the sampling signal appearing between two edges of an opposite type, rising and falling or falling and rising, of the synchronization signal.

The clock deviation measuring circuit further comprises means to verify that the detection of a rising or falling edge corresponds to the reception of several samples of the synchronization signal having a logic majority value corresponding to the edge detected.

The clock deviation measuring circuit may comprise logic gates, flip-flops, logical comparators and counters. The device may also comprise a status machine for detecting the reception of a synchronization character on the reception terminal, and for activating the clock deviation measuring circuit when such a synchronization character is detected.

The present invention also relates to an integrated circuit comprising a device for transmitting data as defined above, and to a microcontroller comprising such a device for transmitting data.

Another aspect of the present invention is directed to a method for transmitting asynchronous data, wherein data received on a data reception terminal is read at the rate of a sampling signal in synchronization with a local clock signal. The method comprises measuring deviation of the local clock signal comprising the determination of a number M of periods of the sampling signal appearing during K periods of a synchronization signal received on the data reception terminal, and the comparison of the number M with a lower threshold M1 and with an upper threshold M2, both predetermined, and defining a tolerance margin.

The method may comprise the delivery of a deviation flag having a first logic value when the number M is not between the thresholds M1 and M2, and a second logic value when the number M is between the thresholds M1 and M2.

The method may also comprise delivery of a first logic signal having a determined logic value when the number of periods of the synchronization signal is equal to K, delivery of a second logic signal having a determined logic value when the number M of periods of the sampling signal is between the thresholds M1 and M2, and delivery of a third logic signal having a determined logic value when the first and the second logic signals exhibit respectively the determined values.

The method may further comprise detecting the reception of a synchronization character on the reception terminal, and upon detection of the reception of the synchronization character, determining a number M of periods of the sampling signal appearing during K periods of the synchronization character.

The number M of periods of the sampling signal may be determined between two edges of a same type, rising or falling, of the synchronization signal. The number M of periods of the sampling signal may be determined between two edges of the opposite type, rising and falling or falling and rising, of the synchronization signal.

The method may further comprise verifying that the detection of a rising or falling edge corresponds to the reception of several samples of the synchronization signal having a logic majority value corresponding to the edge detected.

The method may be implemented using logic gates, flip-flops, logic comparators and counters. The method may also be implemented using a specific circuit with wired logic implanted in an asynchronous data transmission device.

BRIEF DESCRIPTION OF THE DRAWINGS

These objects, characteristics and advantages as well as others of the present invention will be disclosed in more detail in the following description of one embodiment of a deviation measuring circuit according to the invention, prepared without any limitation thereto in relation to the enclosed figures in which.

DETAILED DESCRIPTION OF THE PREFERRED EMBODIMENTS

Figure 5:
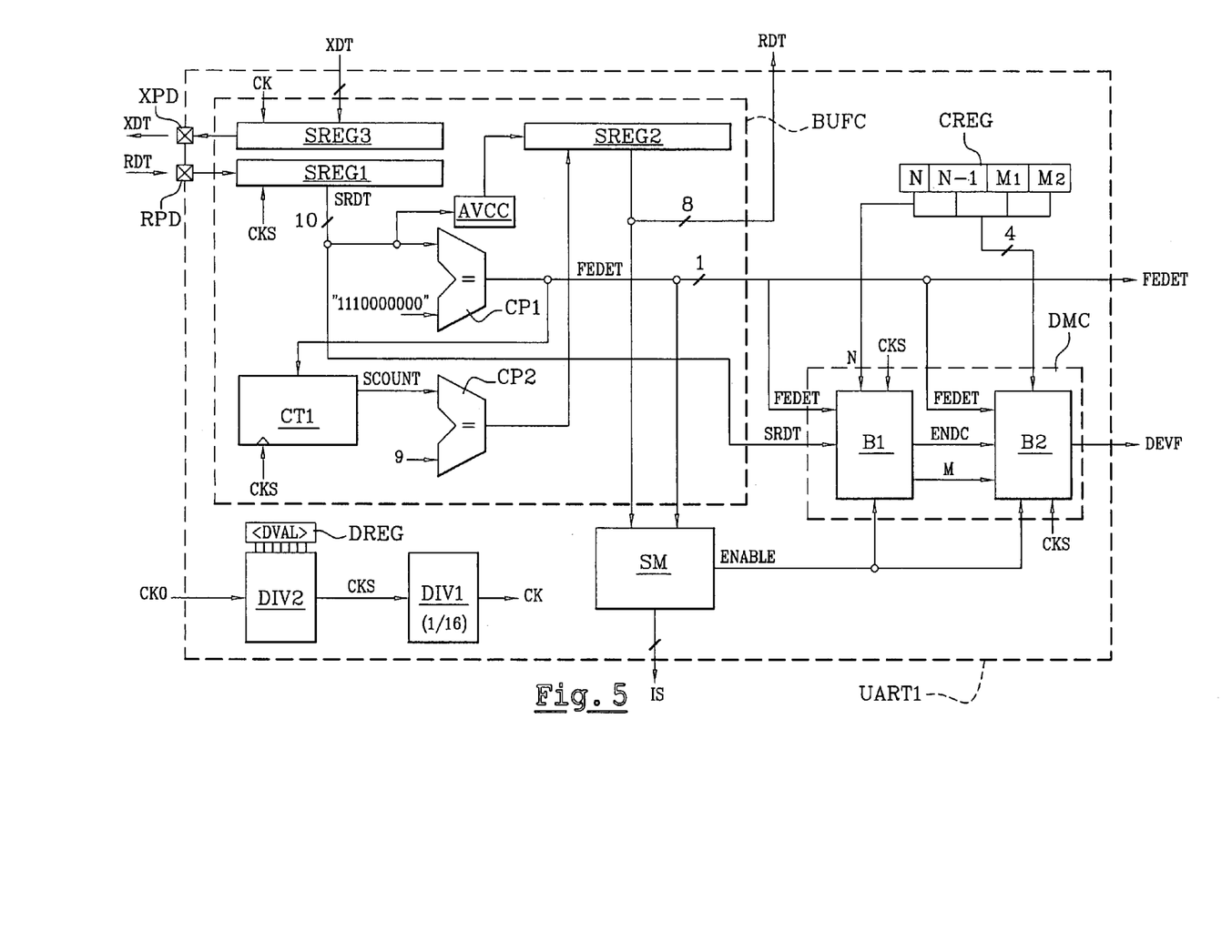
FIG. 5 is a block diagram of a circuit UART comprising a clock deviation measuring circuit in accordance with the present invention.

FIG. 5 represents a circuit UART1 according to the invention comprising a conventional buffer circuit BUFC connected to a data reception terminal RPD and to a data transmission terminal XPD. The circuit UART1 also comprises a divider DIV1 for delivering a local clock signal CK from a sampling signal CKS, a divider DIV2 for delivering the sampling signal CKS from a primary clock signal CK0, and a status machine SM. These various elements have been described above in the discussion of FIG. 1. It should be noted that the dividers DIV1 and DIV2, although represented as being internal the circuit UART1, may instead be external the circuit UART1.

Moreover, the circuit UART1 comprises a deviation measuring circuit DMC which receives at an input the signal FEDET (falling edge detected) delivered by the comparator CP1, as well as the data sample SRDT delivered by the register SREG1. The circuit DMC is activated when a signal ENABLE becomes 1. The signal ENABLE becomes 1 during the detection of the first falling edge of a character SYNC and remains at 1 during the reception of the character SYNC. The signal ENABLE is delivered by the status machine SM, but could also be delivered by a logical circuit internal to the circuit DMC. This signal may be delivered from a signal ENDBRK (not represented) transmitted by the status machine when 11 bits at 0 have been detected in the character BRK.

The circuit DMC delivers a deviation flag DEVF normally at 0 which becomes 1 when a deviation greater than a set threshold is detected. According to the invention, the deviation threshold is determined by numbers or references M1, M2 supplied to the circuit DMC. The references M1 and M2 are, for instance, stored in a control register CREG. Numbers N and N−1 stored in the register CREG are also supplied to the circuit DMC. The variable N designates a number of falling edges detected in a character SYNC.

The circuit DMC as represented in FIG. 5 comprises two logic blocks B1, B2. The block B1 receives the reference N, the signal ENABLE, the signal FEDET (1 bit) and the data sampled SRDT (10 bits). It delivers a counting signal M, which is 8-bit encoded, and a logic signal ENDC (end of counting). The block B2 receives the signal ENABLE, the references N, N−1, M1 and M2, the signals M, ENDC and FEDET, and delivers the flag DEVF.

The following will illustrate one embodiment of the circuit DMC by considering that the numbers M1 and M2 are respectively equal to 114 and 151, and that the reference N is equal to 5. The values of M1 and M2 selected correspond to a maximum deviation on the order of ±15% of the local clock signal CK. This is in accordance with the specifications of the protocol LIN to which it is referred to without any restrictions, as one embodiment of the circuit DMC.

Figure 6:
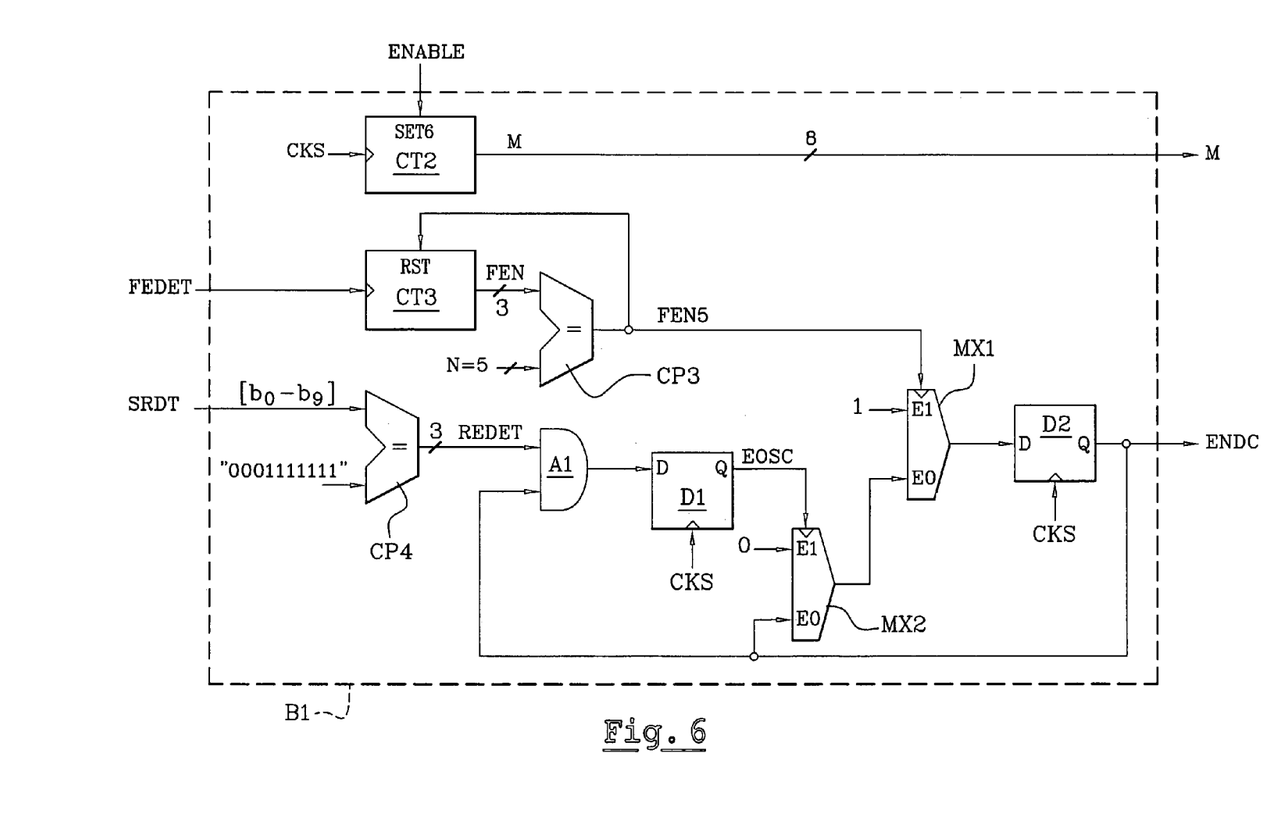
FIG. 6 is a block diagram of the element B1 illustrated in FIG. 5.

One embodiment of the block B1 is represented in FIG. 6. The block B1 comprises the following elements. An 8-bit counter CT2 has a clock input synchronized by the sampling signal CKS, a counting output, and a reset-to-6 input SET6. A 3-bit counter CT3 has a clock input synchronized by the signal FEDET, and a counting output. The block B1 also comprises two logic comparators CP3, CP4 respectively having two inputs, and two multiplexers MX1 MX2 each having two data inputs E0, E1, a selection input, and an output copying the input E1 when the selection input is equal to 1 or copying the input E0 when the selection input is equal to 0. Two D-type flip-flops D1 and D2, respectively have an input D, an output Q and a clock input (synchronization input) triggered on a rising edge and synchronized by the sampling signal CKS. An AND gate A1 is also included in the block B1.

The counter CT2 receives the signal ENABLE on its input SET6 and delivers the counting signal M. The counter CT3 receives the signal FEDET on its clock input, and outputs a signal FEN (number of falling edges) that is applied to an input of the comparator CP3. The other input of the comparator CP3 receives in binary form the reference N, here equal to 5. The output of the comparator CP3 delivers a signal FEN5 applied to the selection input of the multiplexer MX1.

The comparator CP4 receives at its inputs the data sample SRDT and the value 0001111111 forming detection criteria of a rising edge, and deliveries at its output a signal REDET (rising edge detected) applied to an input of the gate A1 whose other input receives the end of counting signal ENDC. The output of the gate A1 is applied to the input D of the flip-flop D1 whose output Q delivers a signal EOSC (end of synchronization character). The signal EOSC is applied to the selection input of the multiplexer MX2, whose input E1 is kept equal to 0 and whose input E0 receives the signal ENDC. The output of the multiplexer MX2 is applied to the input E0 of the multiplexer MX1 whose input E is kept equal to 1. The output of the multiplexer MX1 is applied to the input D of the flip-flop D2 whose output Q delivers the signal ENDC.

Figure 7:
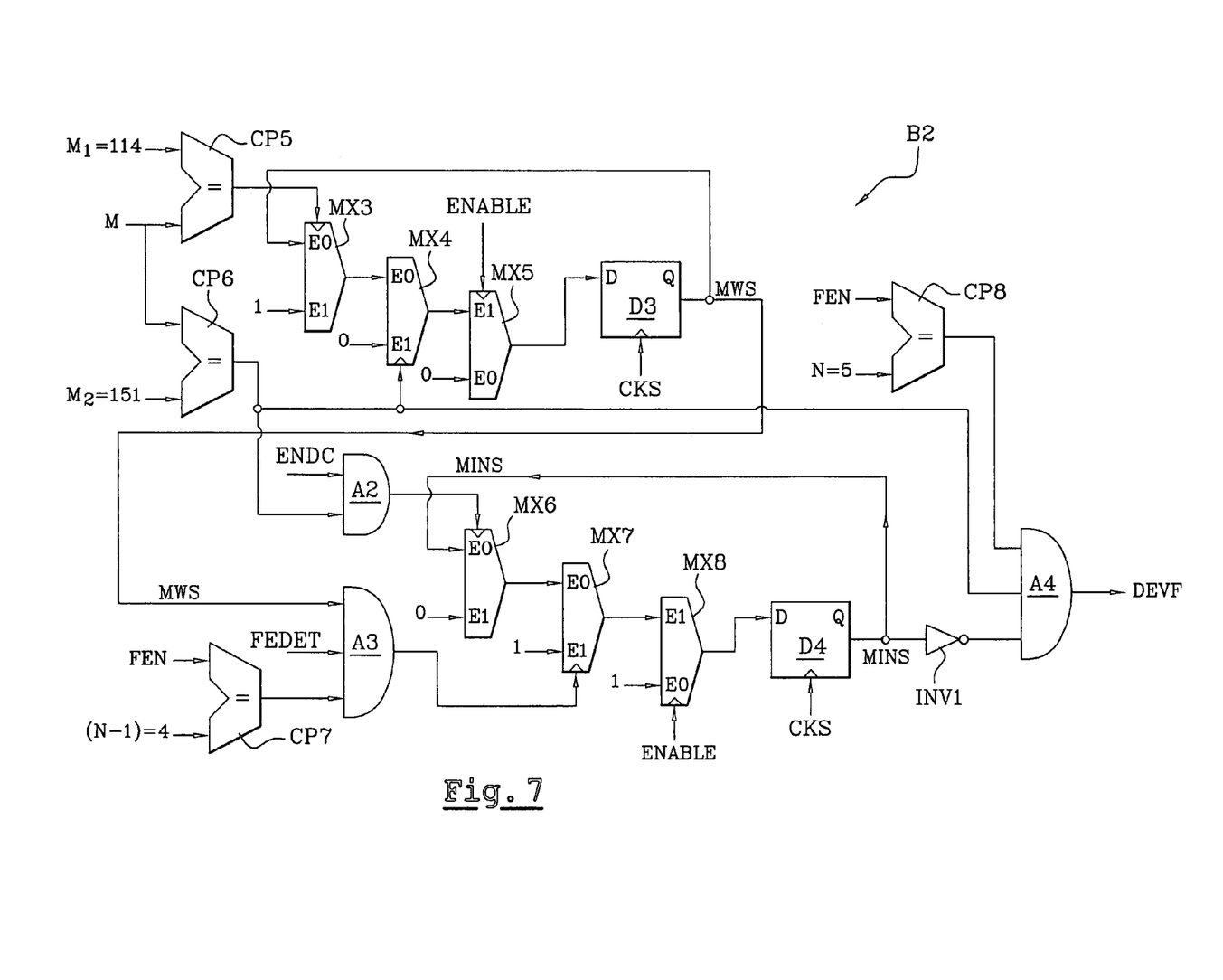
FIG. 7 is a block diagram of the element B2 illustrated in FIG. 5.

One embodiment of the block B2 is represented in FIG. 7. The block B7 comprises four logic comparators CP5 to CP8 each having two inputs, six multiplexers MX3 to MX8 of the type described above, two flip-flops D3, D4 of the type described above and each having their clock input synchronized by the signal CKS, an AND gate A2 having two inputs, and two AND gates A3, A4 each having three inputs.

The comparator CP5 receives on its inputs the reference M1=114 encoded in binary format and the counting signal M. Its output is applied to the selection input of the multiplexer MX3. The comparator CP6 receives on its inputs the reference M22=151 encoded in binary format and the counting signal M. Its output is applied to the selection input of the multiplexer MX4. The multiplexer MX4 has its input E1 kept equal to 0, and its input E0 receives the output of the multiplexer MX3. The output of the multiplexer MX4 is applied to the input E1 of the multiplexer MX5 whose input E0 is kept equal to 0 and whose selection input receives the signal ENABLE. The output of the multiplexer MX5 is applied to the input D of the flip-flop D3 whose output Q delivers a signal MWS (measuring window signal). The signal MWS is applied to the input E0 of the multiplexer MX3 whose input E1 is kept equal to 1.

The gate A2 receives on its inputs the output of the comparator CP6 and the end of the counting signal ENDC. The comparator CP7 receives on its inputs the signal FEN and the reference N−1, here equal to 4. Its output is applied to an input of the gate A3 whose two other inputs receive respectively the signals FEDET and MWS.

The output of the gate A2 is applied to the selection input of the multiplexer MX6, and the output of the gate A3 is applied to the selection input of the multiplexer MX7. The multiplexer MX7 receives on its input E0 the output of the multiplexer MX6, and its input E0 is kept equal to 1. An output of multiplexer MX7 is applied to the input E1 of the multiplexer MX8 whose input E0 is kept equal to 1, and whose selection input is controlled by the signal ENABLE. The output of the multiplexer MX8 is applied to the input D of the flip-flop D4 whose output Q delivers a signal MINS (M INSIDE, i.e., M is within the measuring window). The signal MINS is sent to an input of the gate A4 via a reversing gate INV1. The signal MINS is also applied to the input E0 of the multiplexer MX6, whose input E1 is kept equal to 0. The two other inputs of the gate A4 receive respectively the output of the comparators CP6 and the output of the comparator CP8. The latter receives on its inputs the signal FEN and the reference N=5.

Figures 8A, 8B:
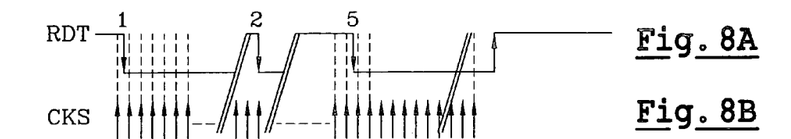
FIGS. 8A to 8K illustrate logic signals appearing in the deviation measuring circuit according to the present invention when a local clock signal shows a deviation within the range of authorized values.
Figure 8C:
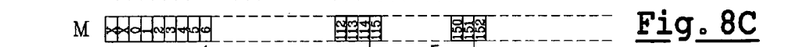
Figure 8D:
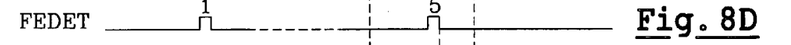
Figure 8E:
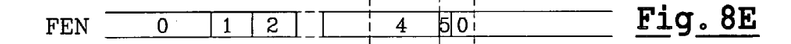
Figure 8F:
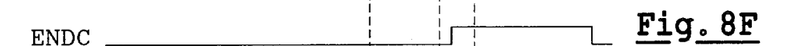
Figure 8G:
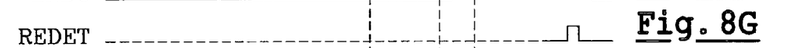
Figure 8H:
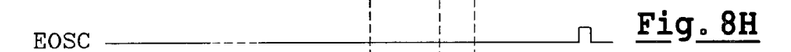
Figure 8I:
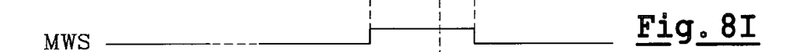
Figure 8J:
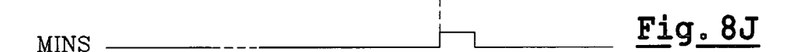
Figure 8K:
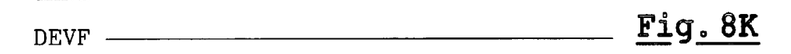

The operation of the circuit DMC is illustrated in FIGS. 8A to 8K, which represent respectively: FIG. 8A: the asynchronous data RDT received on the terminal RDT; FIG. 8B: the sampling signal CKS; FIG. 8C: the counting signal M; FIG. 8D: the detection signal of the falling edges FEDET; FIG. 8E: the counting signal FEN of the number of falling edges; FIG. 8F: the end of counting signal ENDC; FIG. 8G: the detection signal of the rising edges REDET; FIG. 8H: the signal EOSC specifying the end of a character SYNC; FIG. 8I: the measuring window signal MWS; FIG. 8J: the signal MINS specifying that M is equal to the inside of the measuring window; and FIG. 8K: the deviation flag DEVF.

In the operation example illustrated in

FIGS. 8A to 8K, it is assumed that the local clock signal CK shows a deviation smaller than ±15% in relation to the reference clock signal having been used by a remote transmitter (not represented) for generating the character SYNC. Before starting the deviation measuring method, the status machine SM knows that a character SYNC will be received due to the break character which is previously sent by the transmitter (character BRK, see FIG. 1). As specified above, the signal ENABLE is set to 1 after detection of the first falling edge of the character SYNC. It is the falling edge corresponding to the start bit STB, as can be seen in FIG. 2, which is detected by the signal FEDET.

Operation of the block B1 is as follows. The counter CT2 is set to six when the signal ENABLE becomes 1 (input SET6 activated on a rising edge) and starts counting the pulses of the sampling signal CKS. It should be noted that the counter is synchronized on the value 6 (seventh counting cycle from 0) since the detection of the first falling edge of the character SYNC (which causes the signal ENABLE to become 1) occurs after reception of seven samples equal to 0. The counting signal M delivered by the counter CT2, which is encoded on 8 bits, is thus representative at a given moment by the number of pulses of the signal CKS transmitted since the first falling edge of the synchronization character SYNC.

In parallel, the signal FEN delivered by the counter CT3 represents at a given moment the number of falling edges detected since the first falling edge of the synchronization character SYNC. The signal FEN5 at the output of the comparator CP3 becomes 1 when 5 falling edges have been counted. When the signal FEN5 becomes 1, the 1 present on the input E1 of the multiplexer MX1 is selected and is applied to the input D of the flip-flop D2. The signal ENDC then becomes 1 during the following pulse of the signal CKS (FIG. 8F).

Once the signal ENDC has become 1 and when the signal REDET becomes 1 (FIG. 8G, detection of the following rising edge, signal SRDT equal to the criteria 0001111111), the output of the gate A1 becomes 1. The signal EOSC delivered by the output Q of the flip-flop D1 becomes 1 during the following pulse of the signal CK2 (FIG. 8H) and the input E1 of the multiplexer MX2 is selected. The value 0 applied to the input E1 is copied to the input D of the flip-flop D2. The signal ENDC is thus reset to 0 automatically (FIG. 8F) after detection of the first rising edge following the fifth falling edge of the SYNC character.

Operation of the block B2 is as follows. The signal MWS delivered by the flip-flop D3 becomes 1 when the counting signal M becomes equal to M1, here 114, and becomes 0 again when the counting signal becomes equal to M2, here 151 (FIG. 8I).

The signal MINS becomes 1 (FIG. 8J) after the fifth (N=5) falling edge of the character SYNC appears (FIG. 9D), under the condition that the signal MWS is equal to 1. In such a case, the output of the comparator CP7 is equal to 1 since the signal FEN is equal to 4. The signal FEDET is equal to 1 and the signal MWS is equal to 1. The output of the gate A3 is thus equal to 1 and directs the 1 present on the input E1 of the multiplexer MX7 to the input D of the flip-flop D4 via the multiplexer MX8, which is transparent as long as the signal ENABLE is equal to 1. When the signal MINS becomes 1, this forces the output of the gate INV1 to become equal to 0.

The output of the gate A4 remains equal to 0 as long as both outputs of the comparators CP6 and CP8 are not equal to 1. When the signal FEN becomes equal to 5 and the counting signal M becomes equal to the upper threshold M2=151, the outputs of the comparators are equal to 1 and the value of the flag DEVF at the output of the gate A4 only depends on the output of the gate INV1. Thus, when the signal MINS becomes equal to 1, this forces the output of the gate INV1 to become equal to 0. The deviation flag remains equal to 0 (FIG. 8K) which means that the local clock signal CK, whose frequency is a submultiple of that of the sampling signal CKS, shows a deviation within the tolerance margin of ±15% in relation to the reference clock signal.

The signal MINS is automatically reset after the counting signal M has become equal to the reference M2=151. Indeed, the output of the comparator CP6 becomes 1, the signal ENDC is equal to 1 and the output of the gate A2 becomes 1. The value 0 present on the input E1 of the multiplexer MX6 is applied to the input E0 of the multiplexer MX7 and lies on the input D of the flip-flop D4.

Figures 9A, 9B:
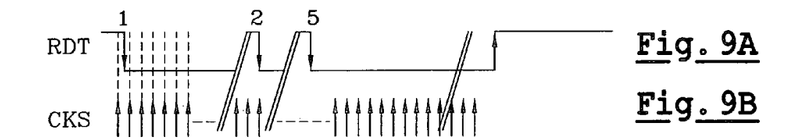
FIGS. 9A to 9H illustrate logic signals appearing in the deviation measuring circuit according to the present invention when a local clock signal shows a deviation outside its range of authorized values.
Figure 9C:
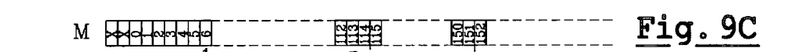
Figure 9D:
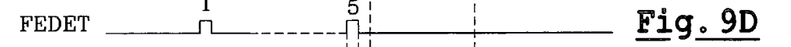
Figure 9E:
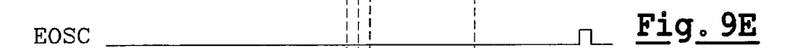
Figure 9F:
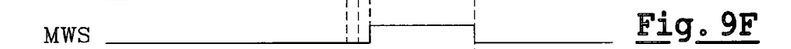
Figure 9G:
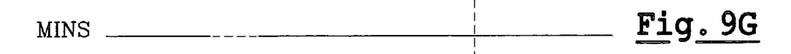
Figure 9H:
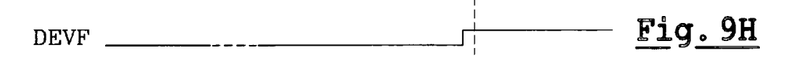

FIGS. 9A to 9H illustrate the case when the local clock signal is too slow before the reference clock signal transmitted by the character SYNC, and represent respectively: FIG. 9A: the data RDT received on the terminal RPD; FIG. 9B: the sampling signal CKS; FIG. 9C: the counting signal M; FIG. 9D: the signal FEDET; FIG. 9E: the signal EOSC; FIG. 9F: the signal MWS; FIG. 9G: the signal MINS; and FIG. 9H: the flag DEVF.

In such a case, the fifth falling edge (signal FEDET, FIG. 9D) appears before the counting signal has reached the value M1 (here when M=112) and consequently before the signal MWS becomes 1 (FIG. 9F). The signal MINS remains equal to 0 (FIG. 9G) and the output of the gate INV1 remains equal to 1. When the outputs of the comparators CP6 and CP8 become 1, the three inputs of the gate A4 are equal to 1 and the flag DEVF becomes 1. This specifies a deviation greater than the tolerance margin.

Figures 10A, 10B:
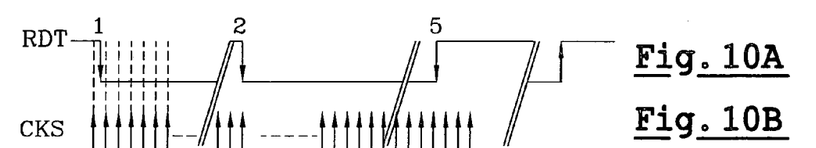
FIGS. 10A to 10H illustrate logic signals appearing in the deviation measuring circuit according to the present invention when a local clock signal shows a deviation outside its range of authorized values.
Figure 10C:
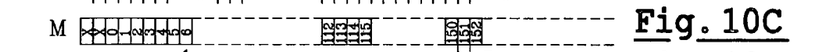
Figure 10D:
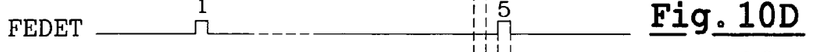
Figure 10E:
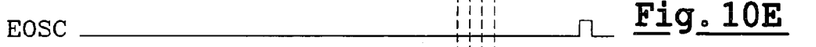
Figure 10F:
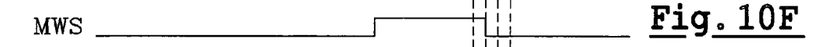
Figure 10G:
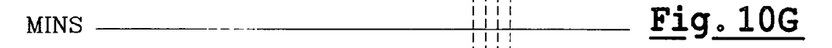
Figure 10H:
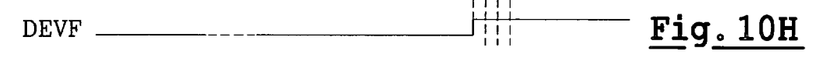

FIGS. 10A to 10H illustrate the case when the local clock signal is too fast before the reference clock signal, and represent respectively: FIG. 10A: the data RDT received on the terminal RPD; FIG. 10B: the sampling signal CKS; FIG. 10C: the counting signal M; FIG. 10D: the signal FEDET; FIG. 10E: the signal EOSC; FIG. 10F: the signal MWS; FIG. 10G: the signal MINS; and FIG. 10H: the deviation flag DEVF.

In such a case, the fifth falling edge (signal FEDET, FIG. 10D) appears after the counting signal has reached the value M2 (here when M=162) and consequently when the signal MWS has come back to 0 (FIG. 10F). The signal MINS remains equal to 0 (FIG. 10G) and the output of the gate INV1 remains equal to 1. When the outputs of the comparators CP6 and CP8 become 1, the three inputs of the gate A4 are equal to 1 and the flag DEVF becomes 1. This specifies a deviation greater than the tolerance margin.

A deviation measuring circuit according to the invention is relatively straightforward, and is inexpensive and not very cumbersome in terms of silicon surface for detecting a synchronization problem. It is therefore susceptible to various applications.

The deviation measuring circuit according to the invention enables an asynchronous frame receiver to verify that the deviation of its local clock has not reached a fixed limit. If such is the case, the receiver must not take into account the frame received, and notably the data characters following the character SYNC. Thus, a receiver with a circuit according to the invention does not waste any time in dealing with false frames or in executing erroneous instructions. Such a receiver does not disturb the network to which it is connected since it does not respond to erroneous instructions. It simply goes back to standby, in anticipation of the next frame beginning. Upon completion of a certain number of failures, this receiver may declare itself as faulty and temporarily cut itself from the network.

Another embodiment of the circuit DMC according to the invention includes providing a detection of deviation between successive falling edges (a detection between successive rising edges being also foreseeable). In such a case, the reference N applied to the comparator CP3 is equal to 2 and corresponds to 2 cycles of the reference clock. The thresholds M1 and M2 are, for instance, equal to 36 and 38 (for 32 sampling cycles between two opposite edges, a tolerance margin of ±15%, and by taking into account the shift of 7 sampling cycles observed during the detection of the edges). A deviation error is detected when the number M of pulses of the sampling signal CKS between two falling edges of the synchronization character is smaller than 36 or greater than 38.

Yet another embodiment comprises controlling the number M of sampling pulses between each rising edge and each falling edge, and between each falling edge and each rising edge of the character SYNC. The threshold M1 is, for instance, equal to 18 and the threshold M2 is equal to 19 (for 16 sampling cycles between two opposite edges, a tolerance margin of ±15%, and by taking into account the shift of 7 sampling cycles during the detection of the edges).

In such a case, the counter CT2 (FIG. 6) receives on its input SET 6 a signal specifying each detection of a rising or falling edge. This is obtained by applying on the input SET6 of the counter CT2 the output of a gate, or receiving at its inputs the signals FEDET and REDET. Besides, the clock input of the counter CT3 receives the signals FEDET and REDET and the counter CT3 is reset to 1 when its output becomes 2 in order to ensure a detection from rising edge to falling edge, and from falling edge to rising edge. The number N is equal to 2 at the input of the comparator CP3 but corresponds here to a single cycle of the reference clock, since the falling edges and the rising edges are counted.

The detection of each falling edge and/or of each rising edge can be secured by checking, after each detection, that the majority bit delivered by the circuit AVCC (FIG. 3) is equal to 0 or to 1, respectively. This verification is obtained in wired logic by combining in an AND gate the FEDET signal with the reversed majority bit. The output of the AND gate delivers a secured falling edge detection signal SFEDET which is used instead of the FEDET signal in the DMC circuit. Similarly, the REDET signal can be combined in an AND gate with the majority bit (not reversed). The output of the AND gate delivers a secured rising edge detection signal SREDET which is used instead of the REDET signal in the DMC circuit.

The present invention compares with the thresholds M1 and M2 the number M of periods of the sampling signal CKS during K periods of the signal SYNC, whereas K can be equal to 1 (detection between two opposite edges), or equal to 2 (detection between two edges of the same nature), and possibly more but not exceeding the number of clock cycles foreseen in the character SYNC (K=10 and N=5 in the example described above).

It also appears that, in this description and in the claims, the term clock deviation measurement has a relative meaning since an error detection between two successive opposite edges or between two successive edges of the same type may be due to an excessive deviation of the local clock, but may also be due to the presence of an invalid data within the SYNC character. For instance, a bit may be set to 0 or set to 1 whose duration is too long, or conversely, too short. Therefore, the present invention also enables detection of corrupt data in the synchronization character due, for instance, to a breakdown on the transmitter side.

A circuit DMC according to the invention may therefore be provided to accumulate several verifications. For instance, a verification of the number of cycles of the sampling signal between the first and the last falling (or rising) edges of the signal SYNC. A verification of the number of cycles of the sampling signal may be made between each rising edge and each falling edge and/or between each falling edge and each rising edge of the signal SYNC.

Figure 11:
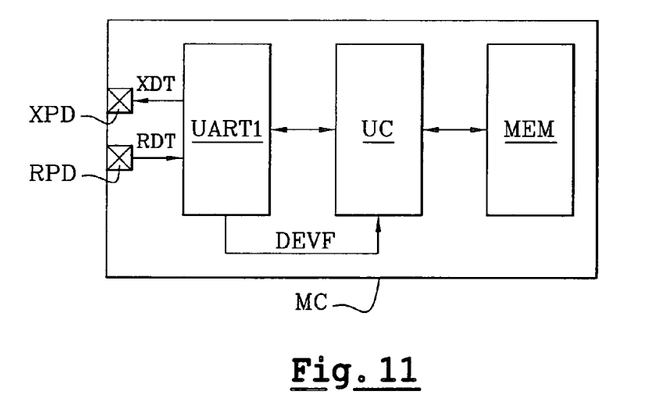
FIG. 11 is a block diagram of a microcontroller in accordance with the present invention.

FIG. 11 illustrates an example of an embodiment of the present invention and represents schematically a microcontroller MC comprising on the same silicon chip a central unit UC, a program memory MEM, and a circuit UART1 according to the invention. The circuit UART1 is connected to input/output ranges RPD/XPD of the integrated circuit. The central unit UC uses the circuit UART1 for transmission and reception of asynchronous data via the ranges XPD, RPD. The flag DEVF is applied to an input of the central unit UC and is sent to the input of an interruption decoder.

That which is claimed is:

1. An asynchronous data transmission device comprising:
a data reception terminal for receiving data including a synchronization signal;
a register connected to said data reception terminal for receiving the data being clocked by a sampling signal in synchronization with a local clock signal; and
a clock deviation measurement circuit connected to said register for determining a number M of periods of the sampling signal appearing during K periods of the synchronization signal, and for comparing the number M to a tolerance margin defined by a lower threshold and an upper threshold.

2. An asynchronous data transmission device according to claim 1, wherein said clock deviation measurement circuit comprises:
deviation flag means for delivering a deviation flag having a first logic value when the number M is not between the lower and upper thresholds, and having a second logic value when the number M is between the lower and upper thresholds.

3. An asynchronous data transmission device according to claim 1, wherein said clock deviation measurement circuit comprises:
first logic signal means for delivering a first logic signal having a first logic value when the number M of periods of the synchronization signal is equal to K;
second logic signal means for delivering a second logic signal having a second logic value when the number M of periods of the sampling signal is between the lower and upper thresholds; and
third logic signal means for delivering a third logic signal having a determined logic value when the first and second logic signals respectively have the first and second logic values.

4. An asynchronous data transmission device according to claim 1, wherein said clock deviation measurement circuit determines the number M of periods of the sampling signal appearing between two rising edges of the synchronization signal or between two falling edges of the synchronization signal.

5. An asynchronous data transmission device according to claim 4, wherein said clock deviation measurement circuit comprises detection means to verify that the detection of the rising edge or the falling edge corresponds to the reception of several samples of the synchronization signal having a logic majority value corresponding to the edge detected.

6. An asynchronous data transmission device according to claim 1, wherein said clock deviation measurement circuit determines the number M of periods of the sampling signal appearing between a rising edge and a falling edge of the synchronization signal or between a falling edge and a rising edge of the synchronization signal.

7. An asynchronous data transmission device according to claim 6, wherein said clock deviation measurement circuit comprises verification means to verify that the detection of the rising edge or the falling edge corresponds to the reception of several samples of the synchronization signal having a logic majority value corresponding to the edge detected.

8. An asynchronous data transmission device according to claim 1, wherein said clock deviation measurement circuit is configured as an integrated circuit.

9. An asynchronous data transmission device according to claim 8, wherein said clock deviation measurement circuit comprises a plurality of logic gates, flip-flops, logic comparators and counters connected together.

10. An asynchronous data transmission device according to claim 1, wherein the synchronization signal received by said data reception terminal includes a synchronization character; and further comprising a status machine connected to said register for detecting reception of the synchronization character and for activating said clock deviation measurement circuit when the synchronization character is detected.

11. A microcontroller comprising:
an asynchronous data transmission device comprising
a data reception terminal for receiving data including a synchronization signal,
a register connected to said data reception terminal for receiving the data being clocked by a sampling signal in synchronization with a local clock signal, and
a clock deviation measurement circuit connected to said register for determining a number M of periods of the sampling signal appearing during K periods of the synchronization signal, and for comparing the number M to a tolerance margin defined by a lower threshold and an upper threshold; and a central unit connected to said asynchronous data transmission device for receiving the data.

12. A microcontroller according to claim 11, wherein said clock deviation measurement circuit delivers a deviation flag having a first logic value when the number M is not between the lower and upper thresholds, and having a second logic value when the number M is between the lower and upper thresholds.

13. A microcontroller according to claim 11, wherein said clock deviation measurement circuit comprises:
a first logic signal circuit for delivering a first logic signal having a first logic value when the number M of periods of the synchronization signal is equal to K;
a second logic signal circuit for delivering a second logic signal having a second logic value when the number M of periods of the sampling signal is between the lower and upper thresholds; and
a third logic signal circuit for delivering a third logic signal having a determined logic value when the first and second logic signals respectively have the first and second logic values.

14. A microcontroller according to claim 11, wherein said clock deviation measurement circuit determines the number M of periods of the sampling signal appearing between two rising edges of the synchronization signal or between two falling edges of the synchronization signal.

15. A microcontroller according to claim 14, wherein said clock deviation measurement circuit verifies that the detection of the rising edge or the falling edge corresponds to the reception of several samples of the synchronization signal having a logic majority value corresponding to the edge detected.

16. A microcontroller according to claim 11, wherein said clock deviation measurement circuit determines the number M of periods of the sampling signal appearing between a rising edge and a falling edge of the synchronization signal or between a falling edge and a rising edge of the synchronization signal.

17. A microcontroller according to claim 16, wherein said clock deviation measurement circuit verifies that the detection of the rising edge or the falling edge corresponds to the reception of several samples of the synchronization signal having a logic majority value corresponding to the edge detected.

18. A microcontroller according to claim 11, wherein the synchronization signal received by said data reception terminal includes a synchronization character; and wherein said asynchronous data transmission device further comprises a status machine connected to said register for detecting reception of the synchronization character, and for activating said clock deviation measurement circuit when the synchronization character is detected.

19. A method for transmitting asynchronous data comprising:
   receiving data including a synchronization signal on a data reception terminal;
   reading the data being clocked by a sampling signal in synchronization with a local clock signal; and
   measuring deviation of the local clock signal by
      determining a number M of periods of the sampling signal appearing during K periods of the synchronization signal, and
      comparing the number M to a tolerance margin defined by a lower threshold and an upper threshold.

20. A method according to claim 19, further comprising providing a deviation flag having a first logic value when the number M is not between the lower and upper thresholds, and having a second logic value when the number M is between the lower and upper thresholds.

21. A method according to claim 19, further comprising:
   providing a first logic signal having a first logic value when the number M of periods of the synchronization signal is equal to K;
   providing a second logic signal having a second logic value when the number M of periods of the sampling signal is between the lower and upper thresholds; and
   providing a third logic signal having a determined logic value when the first and the second logic signals respectively have the first and second logic values.

22. A method according to claim 19, wherein the number M of periods of the sampling signal is determined between two rising edges of the synchronization signal or between two falling edges of the synchronization signal.

23. A method according to claim 22, further comprising verifying that the detection of the rising edge or the falling edge corresponds to the reception of several samples of the synchronization signal having a logic majority value corresponding to the edge detected.

24. A method according to claim 19, wherein the number M of periods of the sampling signal is determined between a rising edge and a falling edge of the synchronization signal or between a falling edge and a rising edge of the synchronization signal.

25. A method according to claim 24, further comprising verifying that the detection of the rising edge or the falling edge corresponds to the reception of several samples of the synchronization signal having a logic majority value corresponding to the edge detected.

26. A method according to claim 19, wherein the synchronization signal received by the data reception terminal includes a synchronization character; wherein the reading comprises detecting reception of the synchronization character; and wherein the measuring is performed in response to the synchronization character being detected.

27. A method according to claim 19, wherein the receiving, the reading and the measuring is implemented in an asynchronous data transmission device.

* * * * *

UNITED STATES PATENT AND TRADEMARK OFFICE
CERTIFICATE OF CORRECTION

PATENT NO. : 7,408,958 B2  
APPLICATION NO. : 10/826969  
DATED : August 5, 2008  
INVENTOR(S) : Ludovic Ruat, Paul Kinowski and Alexander Czajor It is certified that error appears in the above-identified patent and that said Letters Patent is hereby corrected as shown below:

Column 7, Line 12        Delete: "M22"  
                         Insert: -- M2 --

Column 7, Line 34        Delete: "E0"  
                         Insert: -- E1 --

Signed and Sealed this

Twenty-first Day of October, 2008

JON W. DUDAS  
*Director of the United States Patent and Trademark Office*